(12) United States Patent
Wang et al.

(10) Patent No.: US 8,156,066 B2
(45) Date of Patent: Apr. 10, 2012

(54) RULE-BASED CONTENT REQUEST HANDLING

(75) Inventors: Jin-Gen Wang, Lafayette, CO (US); Bill Hopkins, Brighton, CO (US); David Reisfeld, Wellesley, MA (US); Steven P. Higgins, Mead, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 525 days.

(21) Appl. No.: 12/421,084

(22) Filed: Apr. 9, 2009

(65) Prior Publication Data

US 2009/0259611 A1    Oct. 15, 2009

Related U.S. Application Data

(60) Provisional application No. 61/043,663, filed on Apr. 9, 2008.

(51) Int. Cl.
*G06F 17/00* (2006.01)
*G06N 5/02* (2006.01)

(52) U.S. Cl. ......................................................... 706/47
(58) Field of Classification Search ....................... 706/47
See application file for complete search history.

(56) References Cited

U.S. PATENT DOCUMENTS

| | | | |
|---|---|---|---|
| 6,345,264 B1 * | 2/2002 | Breese et al. | 706/21 |
| 6,353,813 B1 * | 3/2002 | Breese et al. | 706/12 |
| 7,289,493 B1 * | 10/2007 | Vera | 370/356 |
| 7,484,002 B2 | 1/2009 | Swildens et al. | |
| 7,995,506 B2 * | 8/2011 | Kalish | 370/310 |
| 2002/0002543 A1 | 1/2002 | Spooren et al. | |
| 2002/0010798 A1 | 1/2002 | Ben-Shaul et al. | |
| 2002/0042817 A1 | 4/2002 | Lahr | |
| 2002/0065899 A1 | 5/2002 | Smith et al. | |
| 2002/0147827 A1 | 10/2002 | Breiter et al. | |
| 2003/0088686 A1 | 5/2003 | Jennings | |
| 2006/0271641 A1 | 11/2006 | Stavrakos et al. | |
| 2007/0130210 A1 | 6/2007 | Park | |
| 2007/0162392 A1 | 7/2007 | McEnroe et al. | |
| 2008/0133767 A1 | 6/2008 | Birrer et al. | |
| 2008/0168516 A1 | 7/2008 | Flick et al. | |
| 2008/0208378 A1 | 8/2008 | Booth et al. | |
| 2009/0282159 A1 | 11/2009 | Wang et al. | |
| 2010/0325303 A1 | 12/2010 | Wang et al. | |

FOREIGN PATENT DOCUMENTS

KR    0796550    1/2008

* cited by examiner

*Primary Examiner* — Michael B Holmes

(57) ABSTRACT

An embodiment of a method includes receiving a content request including a first set of attribute values, using at least one of the attribute values from the first set of attribute values to determine a second set of attribute values, traversing a hierarchy of decision nodes, wherein each decision node implements business logic based on one of the attribute values from the first set of attribute values or the second set of attribute values, and generating a decision from a last node in the hierarchy, wherein the decision dictates how to respond to the content request.

17 Claims, 7 Drawing Sheets

RULE-BASED CONTENT REQUEST HANDLING

CROSS REFERENCE TO RELATED APPLICATIONS

This application claims the benefit of priority to U.S. Provisional Patent Application 61/043,663, filed Apr. 9, 2008, titled "Content Distribution and Delivery in a Network", which is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office files or records, but otherwise reserves all rights to the copyright whatsoever. Copyright© 2009 Level 3 Communications, LLC.

TECHNICAL FIELD

Embodiments presently disclosed generally relate to handling requests for content. More specifically, embodiments herein relate to applying customer rules to user attributes to determine whether a user is permitted to receive requested content.

BACKGROUND

Internet use has grown quickly in recent history and indications are that Internet use will continue to grow. Users access the internet to view all types of content. Today, users can view live presentations of events, such as sporting events. The providers of such content typically want to have some level of control over who views the content. For example, the provider of a live sporting event feed may want to block users in certain geographical areas for licensing purposes.

Typically providers of Internet content are separate entities from the network providers that provide the infrastructure to distribute the content. To reach a very large audience, content providers typically purchase the services of a content delivery network provider, which generally has a large network infrastructure for distributing the content. However, because content providers typically don't have control over distribution, the providers typically have limited control in how, or to whom, the content is distributed.

SUMMARY

Embodiments presently disclosed generally relate to content distribution and delivery in a network. More specifically, embodiments herein relate to a rule-based content request handling architecture.

Various embodiments of a system provide for coordinated generation and execution of rule-based business logic between a content provider and a content distributor. A rule specification utility is provided (e.g., by the content distributor) that allows the content provider to specify rules that the content distributor implements in business logic. The content provider can use default rules and/or specify other rules that dictate how user requests are to be handled based on a number of attribute values associated with requests.

In an embodiment of a system, a rule generation tool generates rules based on rule specifications. The rule generator formats the specified rules into one or more computer-readable programs setting forth the business logic to carry out the rules. In one embodiment, the business logic includes one or more data driven hierarchical decision nodes. Business logic is deployed to a number of content delivery network regions where it is applied to content requests.

In some embodiments rules can be applied to a number of types of attributes, including semi-static attributes, real-time attributes and address-independent attributes. At least some of the attribute values are determined based on an IP address of a content requester. Semi-static attributes are generally attributes for which values can be established in association with Internet protocol addresses in advance and resolved at the time of the request. Real-time attributes are attributes for which the values are established at the time of the request. Address-independent attributes are attributes of the request for which the value is independent of the IP address identified in the request.

In some embodiments, semi-static attributes include, but are not limited to country, city, zip code and autonomous system. Real-time attributes include, but are not limited to, IP address, file type, protocol, encryption and token. Address-independent attributes include time (e.g., time of receipt of request), date, day of week, or system variables. In various embodiments, a mapping of numerous IP addresses and/or IP address ranges to semi-static attribute values is generated and deployed to regional request authorization servers.

An embodiment of a computer implemented method for handling content requests includes receiving rules specifications setting forth rules for handling content requests, encoding the rules specifications into rule-based business logic executable by a computer to handle content requests according to the rules specifications, generating an Internet protocol (IP) address map that associates a plurality of Internet addresses to respective sets of one or more semi-static attribute values, and deploying the rule-based business logic and the IP address map to a plurality of regional request authorization servers.

The method may further include, upon receipt of a content request from a specified IP address, in which the request includes a set of one or more real-time attribute values, determining a set of one or more semi-static attribute values from the IP address map based on the specified IP address, and applying the rule-based business logic to at least the determined set of one or more semi-static attribute values and the set of one or more real-time attribute values to render a handling decision indicating how to respond to the content request.

In an embodiment of the computer-implemented method, applying the rule-based business logic further includes applying the rule-based business logic to one or more address-independent attribute values selected from a group comprising date, time, and day of week. The handling decision may be selected from a group comprising allowing, denying, or redirecting the request. If the selected decision is redirecting the request, the decision may further specify alternate content. The set of semi-static attributes may include continent, country, state, city, zip code, designated market area, metropolitan statistical area, connection type, line speed, IP routing number, and autonomous system number. The set of real-time attributes may include the specified IP address, a protocol, a resource, a directory, a file, a file type and a token. The token can specify one or more other attributes.

An embodiment of a computer program product includes computer-readable media storing computer-executable instructions, which when executed cause a computer to carry out a process. The process includes receiving a content request including a first set of attribute values, using at least one of the attribute values from the first set of attribute values to determine a second set of attribute values, traversing a hierarchy of decision nodes, wherein each decision node implements business logic based on one of the attribute values from the first set of attribute values or the second set of attribute values, and generating a decision from a last node in the hierarchy, wherein the decision dictates how to respond to the content request.

In an embodiment of the computer-program product, yielding a decision includes generating a response selected from a group comprising an allowance of the content request, a denial of the content request and a redirection of the content request. The process may further include receiving rule specifications, and generating computer-executable business logic based on the rule specifications. Receiving the content request may occur at an edge server, and wherein the process may further include reading the first set of attribute values from the content request, formatting the first set of attribute values, and sending the first set of attribute values to a request authorization server associated with the edge server.

An embodiment of a system for handling a content request includes at least one edge server computer configured with content, an administration server computer in communication with the edge server computer, an agent executing on the at least one edge server computer, the agent operable to determine a first plurality of attribute values based on a content request and transmit the first plurality of attribute values to the administration server computer, wherein the first plurality of attribute values comprise an Internet protocol (IP) address, and a request authorization server executing on the administration server computer, the request authorization server operable to receive the first plurality of attribute values and determine a second plurality of attribute values based on the IP address, the request authorization server further including rule-based business logic executable to determine a response to the content request based on one or more of the attribute values from the first plurality of attribute values and the second plurality of attribute values.

In an embodiment of the one of the attribute values read by the agent may be a token embedded in a uniform resource identifier of the content request. The business logic can include a hierarchy of data driven decision nodes, wherein each node makes a decision based on one attribute type. One or more of the decision nodes may make a determination based on a customer identifier, and subsequent decision nodes may implement rules specified by a corresponding customer identified in the first plurality of attribute values. The determined response to the content request may be selected from a group including allowance of the request, denial of the request and redirection of the request. The rule-based business logic may be based on rules specifications from a content provider providing the content.

The system may further include a rule generator operable to receive rules specifications, generate the rule-based business logic and deploy the rule-based business logic to the request authorization server. The system may further include a provisioning tool operable to receive IP address attribute values, generate an IP address attribute map and deploy the IP address attribute map to the request authorization server. The request authorization server may determine the second plurality of attribute values by indexing into the IP address attribute map using the IP address from the first plurality of attribute values.

DETAILED DESCRIPTION

Embodiments presently disclosed generally relate to content distribution and delivery in a network. More specifically, embodiments herein relate to a rule-based content request handling architecture.

Figure 1:
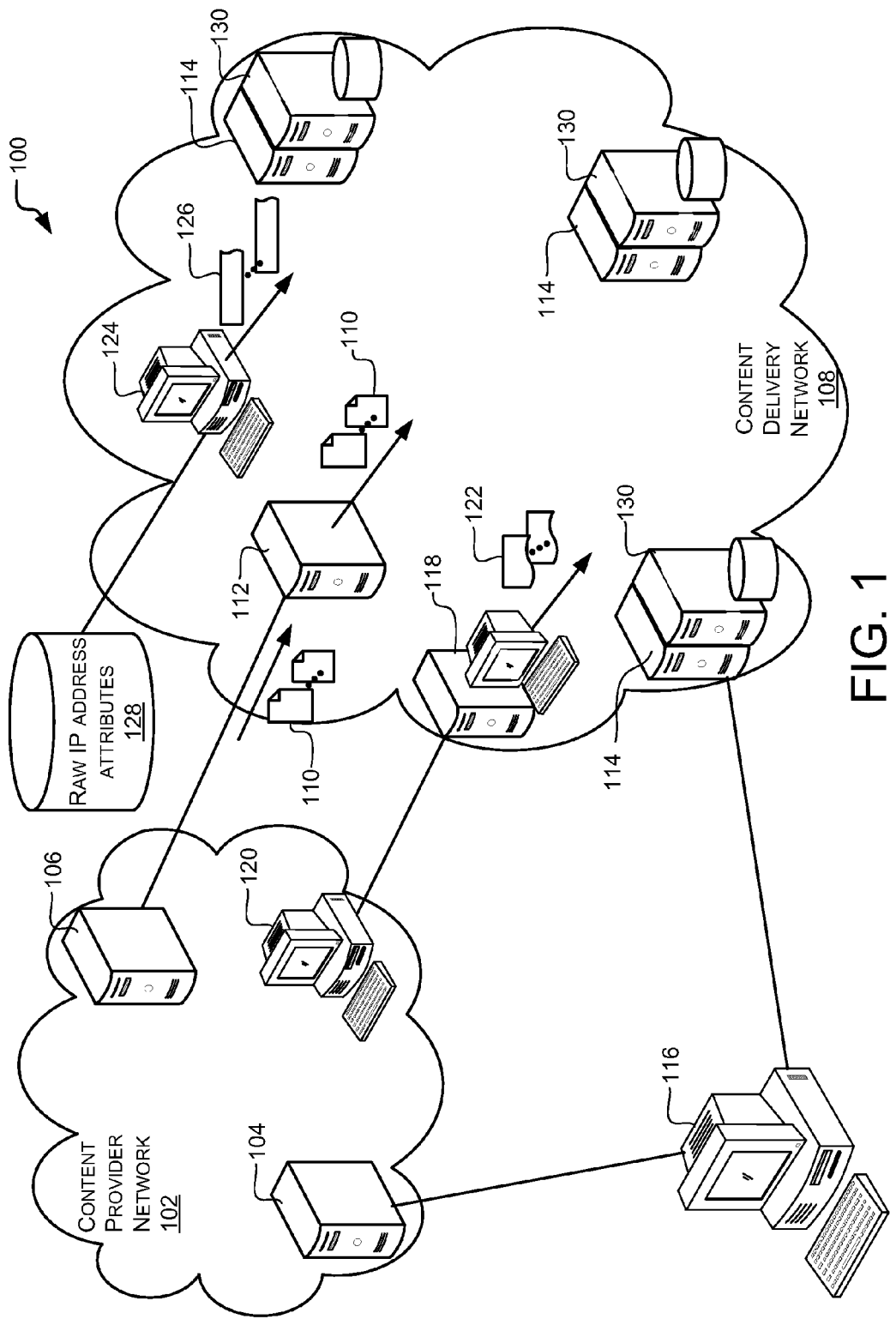
FIG. 1 illustrates an example network environment suitable for distributing content with rule-based content request handling according to various embodiments.

FIG. 1 illustrates an example network environment 100 suitable for carrying out rule-based content request handling according to various embodiments. A content provider maintains a content provider network 102, which may include one or more web page servers 104 and one or more content origin servers 106. A content delivery network (CDN) 108 includes infrastructure for hosting content from the content provider. In the environment 100 of FIG. 1, the content provider may be a customer of the CDN 108 provider, whereby the CDN 108 provider agrees to host content from the content provider.

For example, in various embodiments, content 110 may be propagated from the content origin server 106 of the content provider network 102 to one or more content distribution servers 112 of the CDN 108. The content 110 can be hosted from one or more content distribution servers 112. Alternatively, or in addition, at least some of the content 110 may be stored on, and hosted by, one or more edge servers 114. For example, content may be delivered to the edge servers 114 from the origin server 106 or the distribution server 112. Edge servers 114 may be strategically located within the CDN 108 to provide for geographic proximity to end users, load balancing, or to enhance other performance measures.

A computer end user (not shown) uses a computer 116 to access various network resources such as resources of the content provider network 102 or the CDN 108. Typically, the computer 116 executes a network browser application, such as Internet Explorer™ or Firefox™, for accessing network resources. The computer 116 may also execute a streaming media player, such as Flash Media Player™ or Quicktime™. Through the applications running on computer 116 the user can view, listen to, and otherwise experience content, such as, but not limited to, video, audio, multimedia, images, photographs, web pages, text and others.

For a number of reasons, the content provider may wish to specify how, or whether, content is accessible to the end user. The content provider may wish to specify such accessibility, if any, based on a number of attributes associated with the end user. For example, the content provider may provide a live streaming webcast of a sporting event, which is hosted by the CDN 108. Due to licensing agreements, the content provider may want the live webcast to be accessible only to end users in certain geographic areas. Of course, the end-user of computer 116 may or may not reside within those geographic areas. As another example, a content provider may wish to provide an alternate content item, such as a video clip, if content requested by the end user is unavailable.

To accommodate such content accessibility desires, the CDN 108 includes utilities and functionality whereby content accessibility rules can be defined and business logic generated to handle requests in specified ways. Such rules are typically based on IP addresses of the computers (e.g., computer 116) that issue the content requests, as well as attributes associated with the IP addresses. Rules can specify how to handle a request based on a number of attributes, which can be determined at the time of a request based on the IP address. In this regard, the CDN 108 includes IP address correlation data that characterizes different attributes associated with numerous IP addresses that could be the source of requests, so that rules can be applied based on IP address attributes.

For example, in the embodiment of FIG. 1, the CDN 108 includes a rule generator server 118 operable to receive rule specifications from, for example, an administration computer 120 of the content provider network 102. The rule generator server 118 includes a functional module operable to provide a user interface to the user of computer 120. The user of computer 120, such as a network administrator, can specify content accessibility rules through the user interface. The rule generator server 118 includes functionality for interpreting rule specifications and editing, reformatting or encoding rule specifications into software implemented business logic 122.

In one embodiment, the rule generator server 118 is a network operations computer, which an administrator of the CDN 108 can use to process the rules specifications. In this regard, the functional modules of the rule generator server 118 may provide another user interface through which a user can view the specified rules, edit them and/or reformat them. The rule generator server 118 allows for manual and/or automated generation of rule-based computer executable business logic 122. In one embodiment, the rule-based computer executable business logic 122 is represented in Extensible Markup Language (XML) format.

In the illustrated embodiment, a provisioning tool 124 is provided to generate IP address attribute map entries 126 that associate each of many IP addresses to a set of attributes. The provisioning tool 124 may obtain raw IP address attribute data from a repository 128 and format the data into a parseable and indexible format.

In accordance with various embodiments, the business logic 122 from the rule generator server 118 and IP address attribute map entries 126 are deployed on one or more request authorization server (RAS) computers 130 in the CDN 108. Each RAS computer 130 is geographically proximate to one or more respective edge servers 114. RAS computers 130 include functionality to apply the business logic 122 to attribute values related to content requests received from end-user devices, such as computer 116, in order to generate rule-based responses to those requests. The following figures and description further describe particular embodiments of the various processes and systems shown in FIG. 1.

Figure 2:
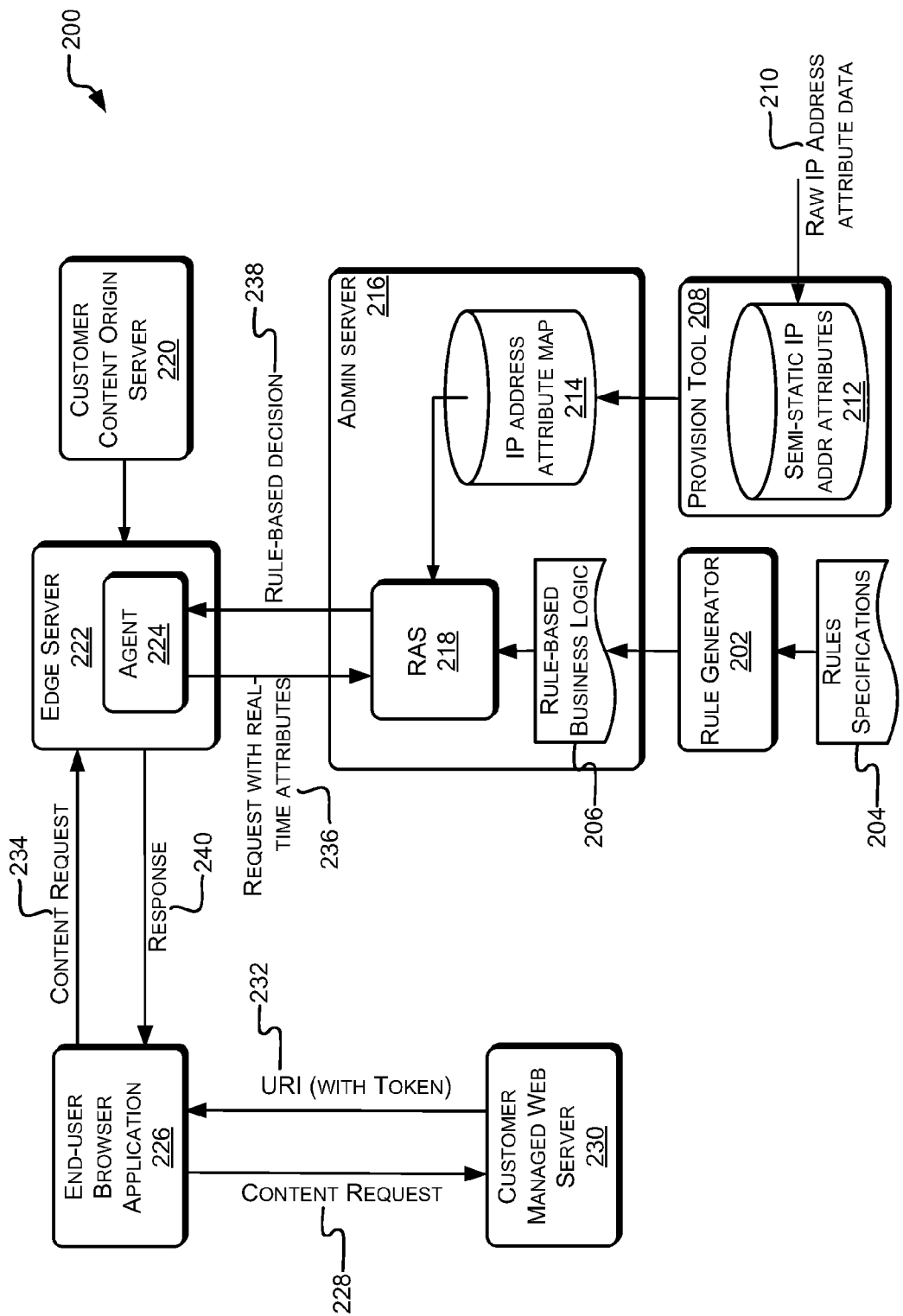
FIG. 2 illustrates a system in terms of functional modules operable to handle content requests according to the embodiment of FIG. 1.

FIG. 2 is a functional block diagram illustrating modules in a system 200 operable to carry out rule-based handling of content requests according to various embodiments. The system 200 can be thought of as including a configuration portion or process and a real-time content request handling portion or process. The configuration portion generates and deploys rule-based business logic and formatted IP address attribute data to request authorization servers (RAS's). The real-time request handling portion applies the rule-based business logic to attribute values associated with real-time content requests to make decisions about how to handle content requests. The various functional modules displayed in the system of FIG. 2 may be implemented in the devices and networks shown in the environment of FIG. 1.

As part of the configuration process, a rule generator 202 receives rules specifications 204 from a customer, such as a content provider. The rule generator 202 is configured to generate computer executable rule-based business logic based on the rules specifications. The rule-based business logic may be in the form of one or more Extensible Markup Language (XML) programs 206. The business logic may be implemented by way of a hierarchy of data driven decision nodes. Through the rule generator 202, decision nodes may be mapped to rules specified by the customer.

As another part of the configuration process, a provisioning tool 208 receives and processes raw IP address attribute data 210. In one embodiment, the raw IP address attribute data 210 is obtained from a commercially available source, such as Quova™. The IP address attribute data maps IP addresses, either individually or in ranges, to a number of semi-static attribute values associated with the IP addresses. For example, the attribute data may include the country, city, zip code and autonomous system number in which each IP address resides. The attribute data may also include the continent, state, designated market area, metropolitan statistical area, connection type, line speed and IP routing type associated with the IP addresses.

The term semi-static is used to indicate that the attribute values may change from time to time, but such change is relatively infrequent for any particular IP address. For example, the semi-static attribute values may change only every few years for a given IP address. However, the raw IP attribute data 210 may change more or less frequently, such as weekly or monthly. In one implementation, in the case of Quova™ data, the IP address attribute data is retrieved weekly, but typically only a small percentage of IP addresses have changes associated with them. The raw IP address attribute data 210 is stored in a data store 212, where it can be processed by the provisioning tool 208.

The provisioning tool 208 typically formats the raw IP address attribute data 210 so that the data is indexible by IP address. In some embodiments, the provisioning tool 208 generates an IP address attribute map, such as is discussed below, which is a data structure that can be indexed by IP address to retrieve attribute values associated with the IP address. After formatting, the IP address attribute map 214 is provisioned on an administrative server 216. Similarly, the rule-based business logic 206 is provisioned onto a request authorization server 218 of the administrative server 216.

When a content request is processed, content is downloaded from the customer content origin server 220 (or a CDN distribution server) to an edge server 222 being administered by administration server 216 if the requested content is not on the edge server 222. The edge server 222 includes a software agent 224, which is operable to gather attribute data from content requests received at the edge server 222. The agent 224 is configured to identify selected attribute values of one or more attribute types, package (e.g., format) the attribute values, and send them to the RAS 218.

The request authorization server (RAS) 218 is configured to apply the rule-based business logic 206 to attribute values associated with content requests. As such, during operation, as requests are received, the RAS 218 uses attribute values determined in part from the request, to decide how to handle the request. Handling the request may involve allowing the content request, denying the content request or redirecting the content request.

For example, an end user's browser application 226 may generate a request 228 for content when the user selects a hyperlink referencing the associated content from a web page hosted on a customer managed web server 230. The request 228 may be in a GET request, in the case of HTTP. The request 228 is sent to, and received by, the customer managed web server 230. The response from the web server 230 includes a uniform resource identifier (URI) that references the location of the desired content item. A token may be embedded in the URI. An example URI that may be generated is shown below:

rtmp://mediacorpfs.fplive.net/mediacorp/drama/george_and_carla.flv

Parts of the URI above are exemplary attribute values that may be used by the RAS 218 in handling the content request. For example "rtmp" designates a protocol, which is a possible attribute type. As another example, "mediacorp" is a customer identifier (ID), which is another possible attribute type. As yet another example, "flv" is the file type, which is yet another possible attribute type. All of the foregoing attribute values may be used in the decision as to how to handle the request.

As mentioned, in some embodiments, the customer can include a token in the URI. The URI shown above does not have an embedded token. The example URI below has an embedded token:

rtmp://mediacorpfs.fplive.net/mediacorp/drama/george_and_carla.flv?token=F71A05E224B90016.

In the example URI above, the token value F71A05E224B90016 has been inserted. The token value may be a hashed or encrypted value that can be decoded or decrypted by the RAS 218. The token may specify one or more attribute values, such as a time constraint, a secret code, a coupon, or others.

After receiving the URI 232, the browser application 226 generates another content request 234 to the edge server 222. The selection of the edge server 222 may occur based on a domain name system (DNS) query, in which the destination of URI 232 is resolved to the IP address of the edge server 222. When the edge server 222 receives the content request 234, the agent 224 parses the request 234 and extracts attribute values which the agent 224 is configured to gather.

For example, in some embodiments the agent 224 may be configured to gather the IP address, customer ID, protocol, file type and resource. These, and other, types of attributes may be referred to as real-time attributes. Other types of real-time attributes are, for example, directory and resource. The agent 224 packages the real-time attribute values it receives and communicates them to the RAS 218 in request 236. The RAS 218 uses the IP address to determine more attributes by indexing into the IP address attribute map 214 with the IP address from the agent 224.

Figure 4:
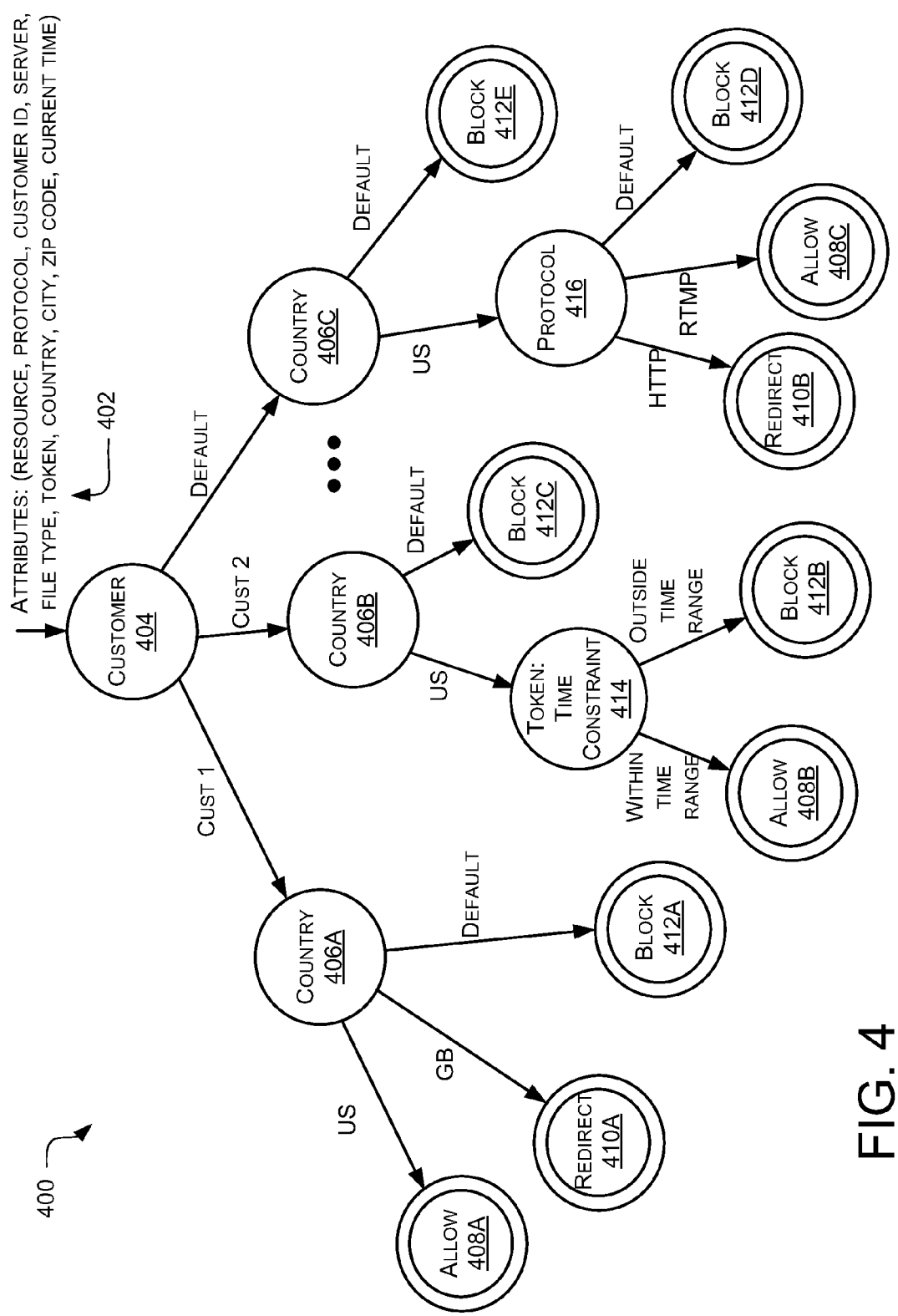
FIG. 4 is an example hierarchical exception based decision tree that may be used to handle content requests in a rule-based manner according to various embodiments.

Using the real-time attributes and the semi-static attributes, and perhaps other attributes, the RAS 218 applies the business logic to determine how to handle the content request 234. In various embodiments, the application of the business logic involves traversing a hierarchy of data driven decision nodes. FIG. 4 illustrates an example embodiment of a hierarchy of decision nodes and is discussed in detail below.

After the RAS 218 applies the business logic, a rule-based decision 238 is generated back to the agent 224. The rule-based decision 238 is incorporated into a response 240 back to the end-user browser 226. As discussed in detail below, the response 240 could be one of a number of different types of responses.

In one embodiment of the system 200, the rule generator 202 and the provision tool 208 operate on server computers centrally located in a CDN and the edge server computer 222 and the administration server computer 216 are located at another region of the CDN. In this embodiment, there may be multiple regions of the CDN in which each region has a cluster of one or more edge server computers and an administration server computer. The rule generator 202 and the provision tool 208 are operable to deploy their respective logic and data to the various regional administration computers.

Figure 3:
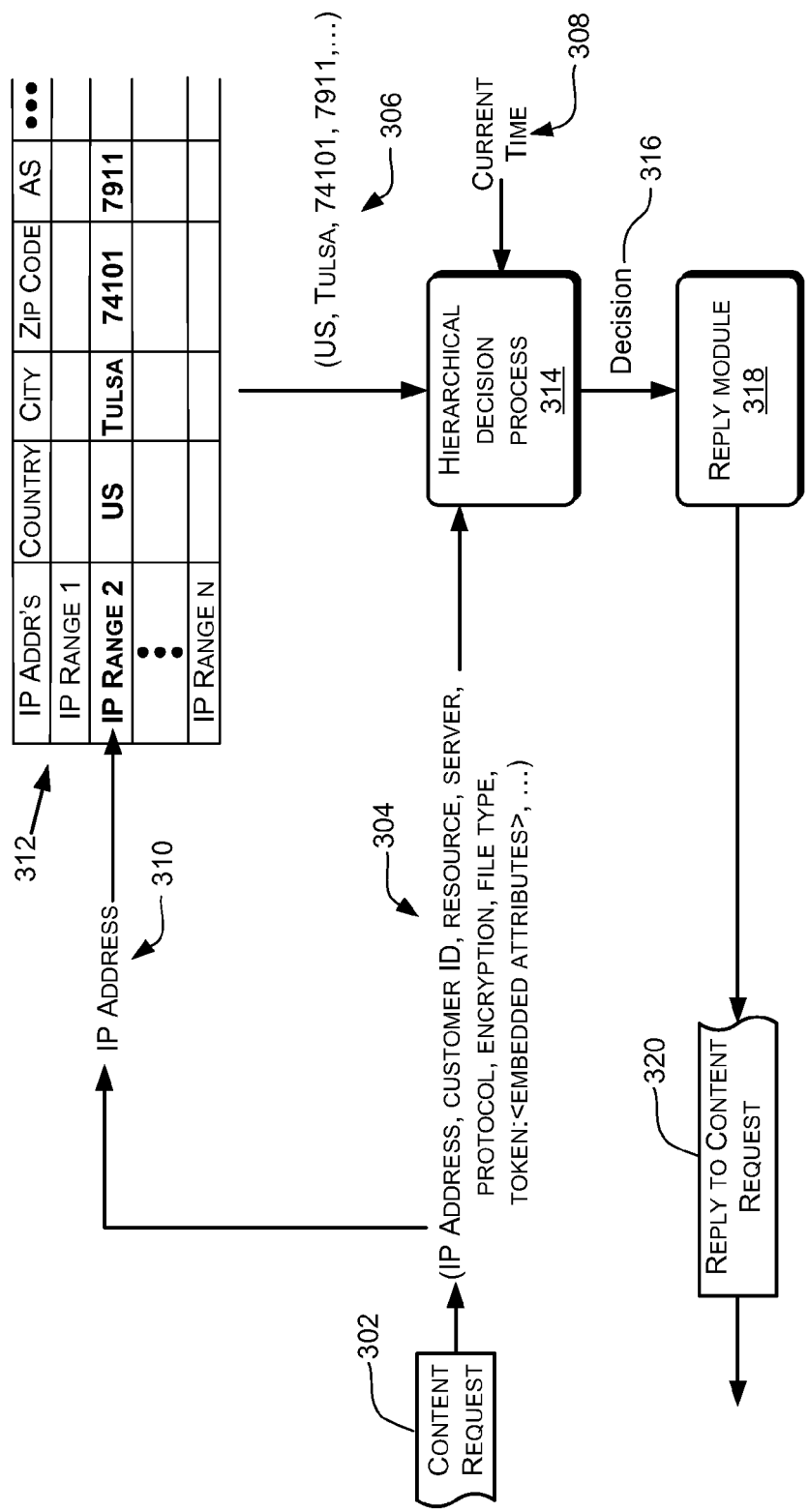
FIG. 3 illustrates an example scenario involving handling a content request by applying rules to various attribute types.

FIG. 3 illustrates an example approach for rule-based handling of content requests. In the illustrated scenario, three general types of attribute values are used to decide how to handle a content request 302: real-time attribute values 304, semi-static attribute values 306, and address-independent attribute values 308. In general, the attribute values are determined at the time of receipt of the content request. Some of the values are address-dependent and others of the attribute values are not address-dependent.

For example, real-time attribute values 304 include IP address, protocol, customer identifier (ID), requested resource, server, file type, token, and/or others, which depend on the received request and are established at the time of the request, or shortly after receipt of the request 302. When the request 302 is received, real-time attributes 304 are extracted, for example by an edge server agent 224 (FIG. 2), from the request 302 and packaged into a format that is parse-able by the hierarchical decision process 314.

Semi-static attributes 306, such as country, city, zip code, autonomous system (AS), and/or others, are determined based on the IP address 310. Therefore, the semi-static attribute values 306 depend upon the request, but they are not considered real-time attributes because they are established prior to the generation of the request and looked up at the time of the request. The semi-static attributes 306 are looked up in an IP address map 312 that maps IP addresses, or address ranges, to one or more respective semi-static attribute values. The IP address 310 is used as an index or key to look up attribute values in the map 312. In the particular scenario illustrated, the IP address 310 is determined to be in the IP address range 2 in the map 312.

The address-independent attribute values 308 include, but are not limited to current time, date or day of week when the request 302 is received. Time is the current time of day, which is not set by the IP address specified in the request. As such, time is independent of the IP address. As discussed herein, current time, date, and/or day of week can be used to compare with a time period, which may be provided in a token in the request 302. Other address-independent attribute values could be system attribute values that are not set or determined based on the IP address.

The real-time attribute values 304, semi-static attribute values 306 and address-independent attribute values 308 are input to a hierarchical decision process 314 executing on a RAS. In various embodiments, the hierarchical decision process 314 is data driven. In such embodiments, at each node in the hierarchy, one or more of the attribute values input to that node, are tested against predetermined values, to thereby determine the output of the node or another node to execute. The hierarchical decision process 314 ultimately issues a handling decision 316, dictating how the content request is to be handled, and therefore, the contents or format of the reply to the content request.

The handling decision 316 is input to a reply module 318. Reply module 318 generates a reply 320 in response to the request 302. The reply 320 may include a response code as well as other information. For example, the reply 320 may include a code indicating whether or not the request for content is allowed, or whether the request is redirected to alternative content.

FIG. 4 is a tree diagram illustrating a hierarchy 400 of decision nodes in a particular scenario. As discussed above, the RAS is configured with a hierarchy of data driven decision nodes for carrying out the business logic. The decision nodes shown in FIG. 4 are arranged in a way to carry out example rule-based business logic. In one embodiment, the nodes are implemented as software objects in C++. In general, one or more attribute values are input to each node. Each node switches on one of the attributes to determine the output path. If the attribute that is switched on is not among the input attributes or if there is no specific switch route for the attribute value, the output path is a default path. Accordingly, every node has a default path.

In the particular scenario shown in FIG. 4, attribute values 402 are input to a top level node, which is a customer node 404. Customer node 404 switches on a customer ID attribute. In this embodiment, the customer ID corresponds to the content provider who provides content for distribution via the CDN. By switching on the customer ID, any decisions made after the customer node can be configured by the customer. In other words, the rule-based business logic can be formatted such that decision nodes after a customer node are based on the rules specifications from the customer.

For example, in the illustrated scenario, if customer 1 is identified in the attribute values 402, control is passed to a country node 406A, which executes business logic in accordance with the rules specified by customer 1. In the particular scenario of FIG. 4, if the attribute values 402 identify the United States as the country, control is passed to an allow node 408A. Allow node 408A generates an output indicating that the content request is allowed. If HTTP is the protocol being used, the allow node 408A generates a "200" code.

If, at country node 406A, the country attribute value is Great Britain, control is passed to a redirect node 410A. Redirect node 410A generates an output indicating that the content request is redirected in some fashion designated by the business logic. For example, business logic could designate an alternate resource, or a tailored message indicating that the request is denied. Of course, customer 1 could have specified in the rules which alternate resource or message the end user should be redirected to. If HTTP is the protocol being used, the redirect node 410A outputs a "302" code.

Returning to the country node 406A, in the particular embodiment, if neither the US or GB are the designated countries in the attribute values 402, then the default path is taken. The default path passes control to a block node 412A. The block node 412A generates an output indicating that the content request is denied. In HTTP the block node 412A outputs a "403" code.

Returning to the customer ID node 404, if customer 2 is identified in the attribute values 402, control passes to another country node 406B. Country node 406B and the nodes below the country node 406B implement business logic in accordance with the rules specified by customer 2. In the case of country node 406B, if the attribute values 402 identify the US as the country, control passes to a token:time constraint node 414. As discussed above, a token can be passed to an end user and where the token is embedded in a content request, thereby allowing the customer to further control how a content request is handled.

Token:time constraint node 414 analyzes time constraint data from a token, if any was passed in the content request. A time constraint, which may be included in a token, can generally be used to specify a time range within which the content request is valid. In the particular scenario illustrated in FIG. 4, token:time constraint node 414 switches on whether the current time is within or outside the time range specified by the time constraint. If the current time (i.e., time of receipt of the content request) is within the specified time range, control passes to another allow node 408B, which allows the content request. If the current time is outside the specified time range, control passes by default to another block node 412B, which denies the content request.

Returning again to customer node 404, if no customers are identified in the attribute values 402 that match customer IDs switched on by the customer node 404, control passes by default to another country node 406C. Country node 406C switches on the country data in the attribute values 402. In the particular scenario, if the US is not identified in the attribute values 402, control passes by default to another block node 412E, which denies the content request.

On the other hand, if the US is identified in the attribute values 402, control passes from the country node 406C to a protocol node 416. Protocol node 416 includes business logic that makes a decision based on the protocol associated with the content request. In the illustrated scenario, if HTTP and RTMP are not identified in the attribute values 402, control passes by default to another block node 412D, which denies the content request.

On the other hand, if HTTP is identified in the attribute values 402, control is passed to another redirect node 410B, which redirects the content request to an alternative resource. As discussed above, in the case of a redirect decision, the customer can specify the alternate resource or message that the user is redirected to. Alternatively, if RTMP is identified in the attribute values 402, control is passed to another allow node 408C, which allows the content request.

With regard to the hierarchy 400 shown in FIG. 4, the hierarchy 400 is for illustration purposes only to demonstrate one possible scenario using a data driven hierarchical decision tree. It will be understood by those skilled in the art that, in operation, numerous other types of nodes can be included in a hierarchy to carry out business logic. For example, other decision nodes may be a file type node, which makes a decision based on file type, and a file location node, which makes a decision based on the location of a file within a directory structure. Furthermore, the arrangement of the decision nodes is not fixed. Indeed, the nodes can be arranged in numerous ways to implement all variations of business logic.

Figure 5:
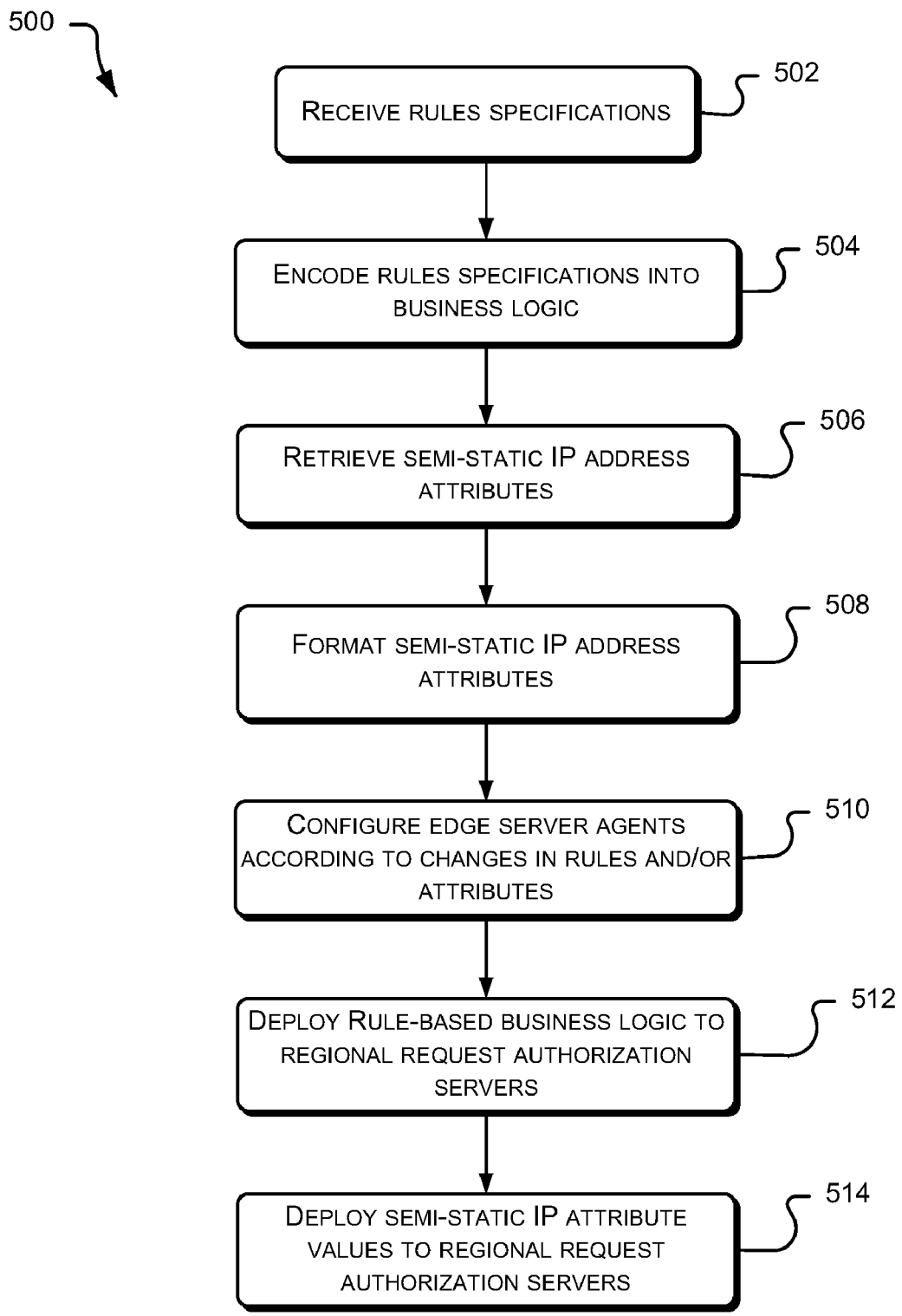
FIG. 5 is a flow chart illustrating an example process for configuring components to perform rule-based handling of content requests.

FIG. 5 is a flowchart illustrating an example rule-based configuration process 500 for generating rules in the form of business logic and configuring request authorization servers with the business logic so the request authorization servers can handle content requests according to specified rules. According to at least one embodiment, operations of the process 500 are carried out at one or more centrally located server computers. The process 500 may be carried out substantially periodically (e.g., weekly) and/or in response to changes in rules or changes to semi-static attributes with respect to IP addresses.

In a receiving operation 502, rules specifications are received. In one embodiment of the receiving operation 502, the rules are specified by a user who can enter the specifications through a user interface. The user may be offered different request handling operations for each of a combination of attribute values associated with requests. For example, the user may have the option to specify a particular rule applicable to requests associated with a particular protocol and/or for requests from an end user IP address in a particular geographic location. A default handling option is available for selection during the receiving operation 502.

In an encoding operation 504, the specified rules are encoded into computer-readable business logic. In one embodiment of the encoding operation 504, the rules are encoded into Extensible Markup Language (XML) programs. Further, the rules are encoded to create a data driven hierarchical exception based decision process. In a data driven hierarchical exception based decision process, multiple decision nodes are arranged hierarchically and a decision is made at each node based on attribute values that enter the node. At each node there is a default option if the attribute values do not correspond to any of the other options. At the last decision node, a final decision is rendered regarding how to handle the request based on the attribute values associated with the request.

In a retrieving operation 506, semi-static attributes associated with IP addresses are retrieved from a repository in raw form. In some embodiments, the repository is an aggregation of IP addresses, in which each IP address is associated with various attributes that change relatively infrequently. For example, semi-static attributes may include geographic and network attributes. The repository may be available from an information vendor, such as Quova™, which is a geolocation company that generates, and makes commercially available, IP address attribute information in a raw format for many (e.g., thousands or millions) IP addresses.

In at least one embodiment, retrieving operation 506 ingests at least some of the attributes and attribute values associated with at least some of the IP addresses in the repository. The retrieving operation 506 retrieves the IP addresses and their associated attributes in a raw format. A formatting operation 508 then formats the semi-static IP address attributes. In one embodiment, the formatting operation 508 transforms the attribute data from the raw format into a form that is usable by request authorization servers to apply the rules to the attributes. The usable format is typically a parseable format readable by the RAS's.

The formatting operation 508 may also generate an IP address attribute map, such as map 312 (FIG. 3), that maps IP addresses to attribute values, so that IP addresses can be looked up when received in requests. In the formatting operation 508, the IP addresses may also be filtered to include IP addresses that are within one or more network spaces accessible by, or assigned to, at least one server.

In a configuring operation 510, agents (e.g., agent 224 (FIG. 2)), or other suitable components, on regionally based edge servers are updated based on changes, if any, to rules and/or attributes. In the configuring operation 510, for example, one or more edge server agents may be updated to capture new or different types of attribute values associated with content requests. For example, an agent may be updated to capture a protocol attribute of a content request. The new attribute (e.g., protocol) can then be used in the rule-based decision making process. Typically, the one or more agents are configured prior to deploying updated rule-based business logic, so that the attributes are available from the agents when the rule-based business logic begins executing.

In a deploying operation 512, the rule-based business logic is deployed to one or more RAS's. In deploying operation 512, business logic is copied to memory of the RAS's where it can be executed and applied to incoming content requests. In another deploying operation 514, semi-static attributes are deployed to the RAS's. In deploying operation 514, the semi-static attributes, which were formatted in operation 508, are copied to memory (e.g., a regional database) accessible by the RAS's, where they can be used by the RAS's to characterize incoming content requests when applying the rules of the rule-based business logic.

Figure 6:
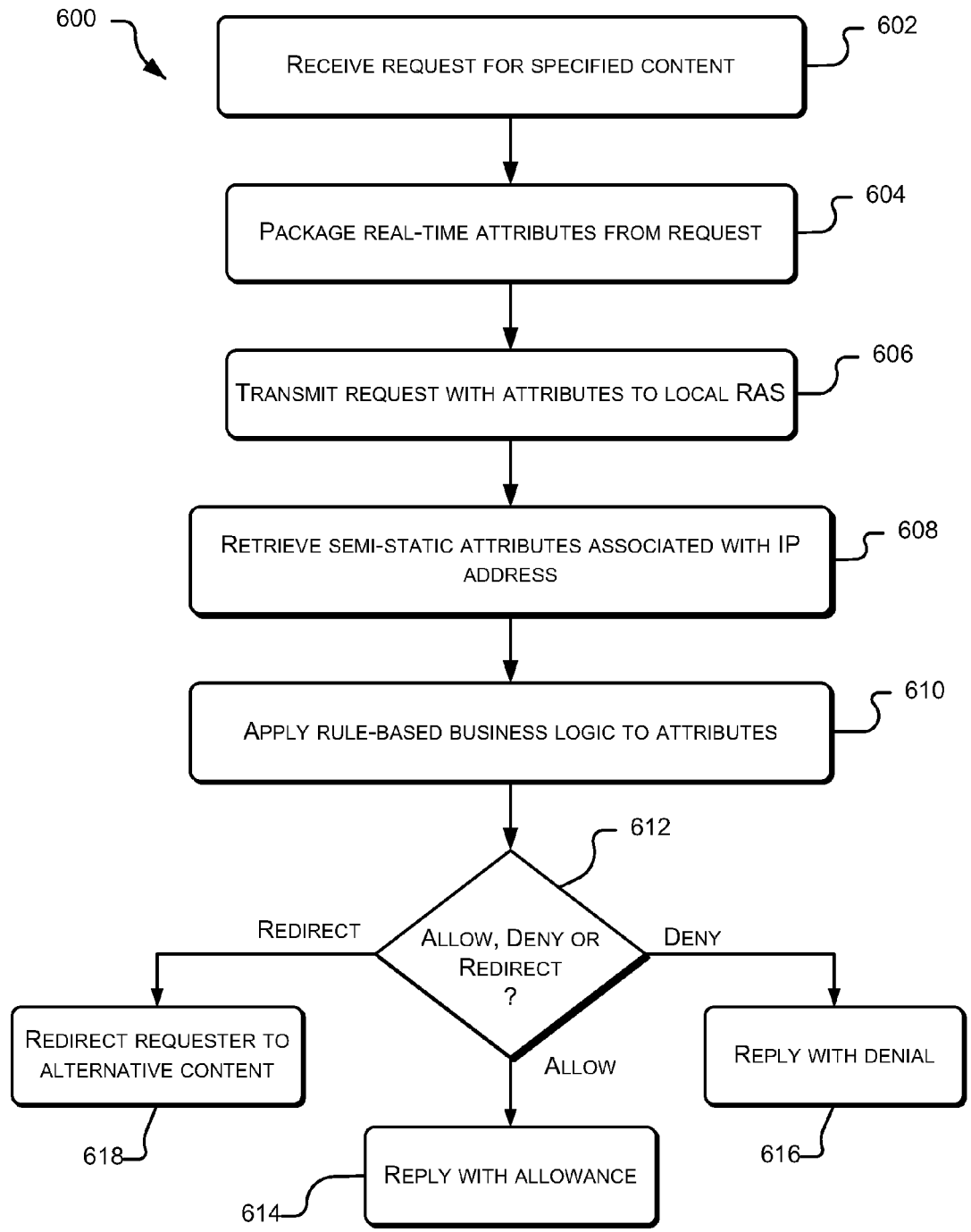
FIG. 6 is a flow chart illustrating an example process for executing rule-based business logic in response to receiving a content request to determine how to handle the request.

After the agents are configured and the rule-based business logic and the semi-static IP address attribute data are deployed to regionally based request authorization servers, the RAS's can begin applying the rules to incoming content requests. An example rule-based content request handling process 600 is shown in FIG. 6. The handling operation 600 begins with a receiving operation 602, in which a content request is received.

In receiving operation 602, a content request is received by an edge server. Within the edge server, the request is passed to an agent configured to process various attribute data in the request. In a packaging operation 604, the request is processed and one or more relevant real-time attribute values are gathered and formatted according to the configuration of the agent. For example, the agent may gather the IP address, customer ID, resource, server, protocol, encryption (if any), token (if any) and file type associated with the request.

In one embodiment, the agent packages as many real-time attribute values as are available within the request, for which the agent is configured to gather. If a given real-time attribute value is not included in the request, the agent will not package that particular attribute value. This is generally not a problem, because the rule-based business logic is designed to handle virtually any combination of real-time attributes to reach a decision as to how to handle the request.

In a transmitting operation 606, the content request, along with packaged attribute values, is sent to a local request authorization server (RAS). In one embodiment, the RAS is included in a server cluster including the edge server that received the request and perhaps one or more other edge servers. The RAS may reside on a separate server computer within the cluster. Of course, the transmitting operation 606 transmits attribute values such as IP address, protocol, encryption, token and file type associated with the request and packaged by the agent.

In a retrieving operation 608, a local repository of semi-static attributes is accessed to determine semi-static attribute values associated with the received content request. In one embodiment, the IP address from which the request originated, is used as a key or index into the local attribute repository. Using the IP address, the retrieving operation 608 can gather semi-static attributes, such as country, city, zip code or autonomous system, associated with the IP address.

In an applying operation 610, the rules encoded in the rule-based business logic are applied to real-time, semi-static attribute values, and/or other attributes (e.g., address-independent attributes), associated with the content request. In one embodiment of the applying operation 610, a data driven hierarchy of decision nodes (e.g., hierarchy 400 (FIG. 4)) is executed. During execution of the data driven hierarchy of decision nodes, the attribute values associated with the content request are input to the nodes. One or more attributes are analyzed at each node to determine an outcome based on the business logic at that node. Depending on the outcome at each decision node, another node of the hierarchy is executed to carry out further business logic, unless it is the last node of the hierarchy (the leaf node), in which case, a final decision is rendered dictating how to handle the request.

In a querying operation 612, it is determined whether the final decision is to allow, deny or redirect the content request. If the final decision is to allow the content request, the querying operation 612 branches "ALLOW" to replying operation 614. Replying operation 614 replies to the content request with a response indicating that the request is allowed. In the case of hypertext transport protocol (HTTP), the response includes a 200 or 202 code. Replying operation 614 also provides the requested content to the end user.

If the querying operation 612 determines that the content request is denied, the querying operation 612 branches "DENY" to another replying operation 616. In replying operation 616, a response is generated that indicates that the content request is denied. In HTTP, the response includes a 4XX code (e.g., 400, 404 or 403).

If the querying operation 612 determines that the content request is to be redirected, the querying operation 612 branches "REDIRECT" to a redirecting operation 618. In redirecting operation 618 a response is generated indicating that the request is redirected to an alternative resource or server. In HTTP, the redirecting response includes a 3XX code (e.g., 302). The redirecting operation 618 may also include a link to alternative content.

Figure 7:
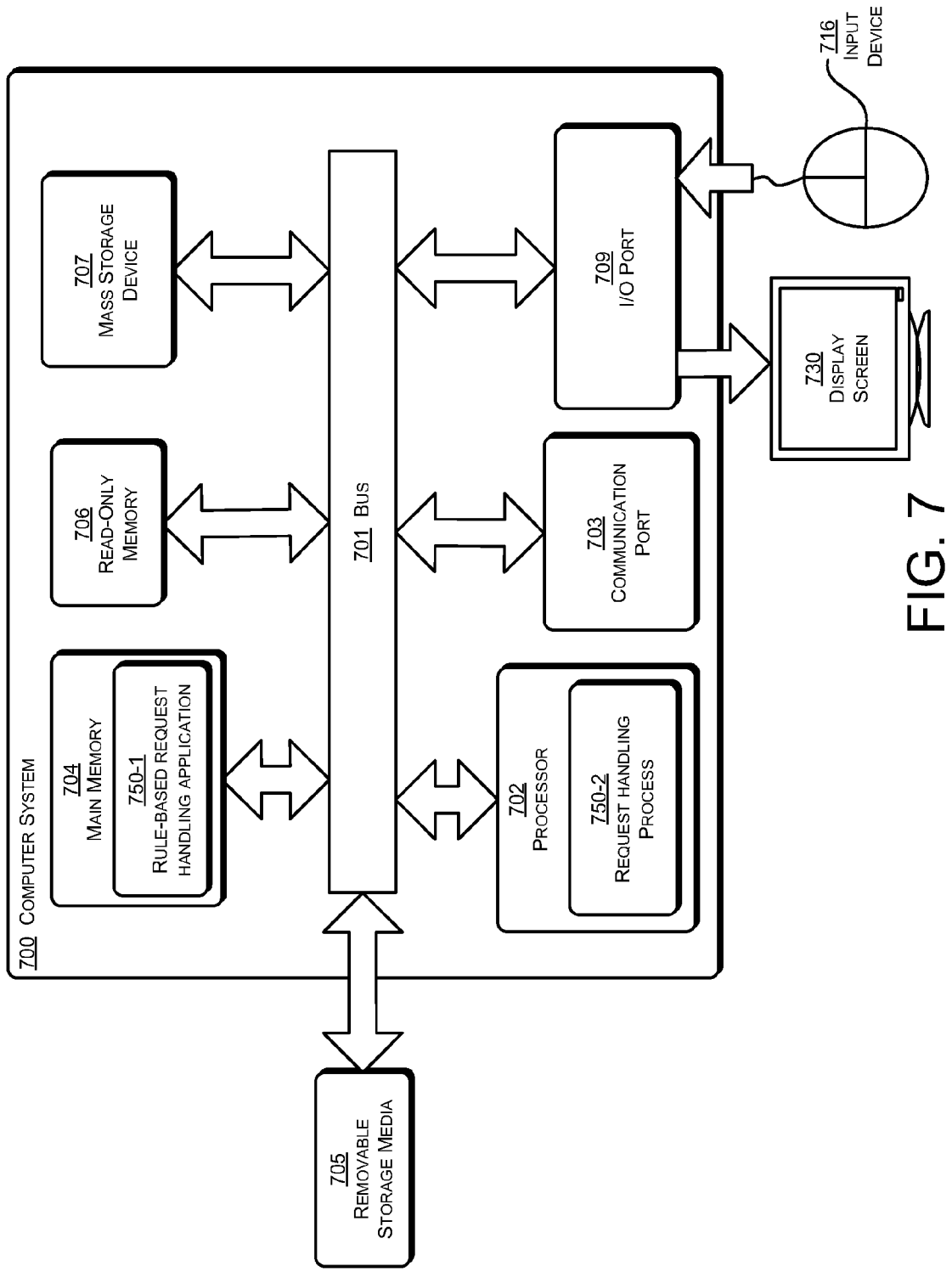
FIG. 7 is an example block diagram of a computer system configured with a rule-based content request handling application and process according to embodiments herein.

FIG. 7 is a schematic diagram of a computer system 700 upon which embodiments of the present invention may be implemented and carried out. For example, one or more computing devices 700 may be configured to implement rule-based content request handling based on multiple types of attributes. Computer system 700 generally exemplifies any number of computing devices, including general purpose computers (e.g., desktop, laptop or server computers) or specific purpose computers (e.g., embedded systems).

According to the present example, the computer system 700 includes a bus 701 (i.e., interconnect), at least one processor 702, at least one communications port 703, a main memory 704, a removable storage media 705, a read-only memory 706, and a mass storage 707. Processor(s) 702 can be any known processor, such as, but not limited to, an Intel® Itanium® or Itanium 2® processor(s), AMD® Opteron® or Athlon MP® processor(s), or Motorola® lines of processors.

Communications ports 703 can be any of an RS-232 port for use with a modem based dial-up connection, a 10/100 Ethernet port, a Gigabit port using copper or fiber, or a USB port. Communications port(s) 703 may be chosen depending on a network such as a Local Area Network (LAN), a Wide Area Network (WAN), or any network to which the computer system 700 connects. The computer system 700 may be in communication with peripheral devices (e.g., display screen 730, input device 716) via Input/Output (I/O) port 709.

Main memory 704 can be Random Access Memory (RAM), or any other dynamic storage device(s) commonly known in the art. Read-only memory 706 can be any static storage device(s) such as Programmable Read-Only Memory (PROM) chips for storing static information such as instructions for processor 702. Mass storage 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 701 communicatively couples processor(s) 702 with the other memory, storage and communications blocks. Bus 701 can be a PCI/PCI-X, SCSI, or Universal Serial Bus (USB) based system bus (or other) depending on the storage devices used. Removable storage media 705 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with a content request handling application 750-1 that supports functionality as discussed herein. For example, content request handling application 750-1 can include the RAS 218 of FIG. 2. Content request handling application 750-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 702 accesses main memory 704 via the use of bus 701 in order to launch, run, execute, interpret or otherwise perform the logic instructions of the content request handling application 750-1. Execution of content request handling application 750-1 produces processing functionality in content request handling process 750-2. In other words, the content request handling process 750-2 represents one or more portions of the content request handling application 750-1 performing within or upon the processor(s) 702 in the computer system 700.

It should be noted that, in addition to the content request handling process 750-2 that carries out operations as discussed herein, other embodiments herein include the content request handling application 750-1 itself (i.e., the un-executed or non-performing logic instructions and/or data). The content request handling application 750-1 may be stored on a computer readable medium (e.g., a repository) such as a floppy disk, hard disk or in an optical medium. According to other embodiments, the content request handling application 750-1 can also be stored in a memory type system such as in firmware, read only memory (ROM), or, as in this example, as executable code within the main memory 704 (e.g., within Random Access Memory or RAM). For example, content request handling application 750-1 may also be stored in removable storage media 705, read-only memory 706, and/or mass storage device 707.

Example functionality supported by computer system 700 and, more particularly, functionality associated with content request handling application 750-1 and content request handling process 750-2 is discussed above in detail with reference to FIGS. 1-6.

In addition to these embodiments, it should also be noted that other embodiments herein include the execution of the content request handling application 750-1 in processor(s) 702 as the content request handling process 750-2. Thus, those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations.

Alternatively, the steps may be performed by a combination of hardware, software, and/or firmware. The term "module" refers to a self-contained functional component, which can include hardware, software, firmware or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer program product comprising computer-readable media having stored thereon, computer-executable instructions, which, when executed cause a computing device to carry out a process, the process comprising:
   receiving a content request including a first set of attribute values;
   using at least one of the attribute values from the first set of attribute values to determine a second set of attribute values;
   traversing a hierarchy of decision nodes, wherein each decision node implements business logic based on one of the attribute values from the first set of attribute values or the second set of attribute values; and
   yielding a decision from a last node in the hierarchy, wherein the decision dictates how to respond to the content request.

2. The computer program product of claim 1, wherein yielding a decision comprises generating a response selected from a group comprising an allowance of the content request, a denial of the content request and a redirection of the content request.

3. The computer program product of claim 1, the process further comprising:
   receiving rule specifications; and
   generating computer-executable business logic based on the rule specifications.

4. The computer program product of claim 1, wherein receiving the content request occurs at an edge server, and wherein the process further comprises:
   reading the first set of attribute values from the content request;
   formatting the first set of attribute values; and
   sending the first set of attribute values to a request authorization server associated with the edge server.

5. A system for handling a content request, the system comprising:
   at least one edge server computer configured with content;
   an administration server computer in communication with the edge server computer;
   an agent executing on the at least one edge server computer, the agent operable to determine a first plurality of attribute values based on a content request and transmit the first plurality of attribute values to the administration server computer, wherein the first plurality of attribute values comprise an Internet protocol (IP) address; and
   a request authorization server executing on the administration server computer, the request authorization server operable to receive the first plurality of attribute values and determine a second plurality of attribute values based on the IP address, the request authorization server further including rule-based business logic executable to determine a response to the content request based on one or more of the attribute values from the first plurality of attribute values and the second plurality of attribute values.

6. The system of claim 5, wherein one of the attribute values read by the agent is a token embedded in a uniform resource identifier of the content request.

7. The system of claim 5, wherein the business logic comprises a hierarchy of data driven decision nodes, wherein each node makes a decision based on one attribute type.

8. The system of claim 5, wherein the determined response to the content request is selected from a group comprising allowance of the request, denial of the request and redirection of the request.

9. The system of claim 5, wherein the rule-based business logic is based on rules specifications from a content provider providing the content.

10. The system of claim 5, further comprising a rule generator operable to receive rules specifications, generate the rule-based business logic and deploy the rule-based business logic to the request authorization server.

11. The system of claim 5, further comprising a provisioning tool operable to receive IP address attribute values, generate an IP address attribute map and deploy the IP address attribute map to the request authorization server.

12. The system of claim 11, wherein the request authorization server determines the second plurality of attribute values by indexing into the IP address attribute map using the IP address from the first plurality of attribute values.

13. The system of claim 7, wherein one or more of the decision nodes makes a determination based on a customer identifier, and wherein subsequent decision nodes implement rules specified by a corresponding customer identified in the first plurality of attribute values.

14. A computer-implemented method comprising:
   receiving a content request including a first set of attribute values;
   using at least one of the attribute values from the first set of attribute values to determine a second set of attribute values;
   traversing a hierarchy of decision nodes, wherein each decision node implements business logic based on one of the attribute values from the first set of attribute values or the second set of attribute values; and
   yielding a decision from a last node in the hierarchy, wherein the decision dictates how to respond to the content request.

15. The computer-implemented method of claim 14, wherein the step of yielding a decision comprises generating a response selected from a group comprising an allowance of the content request, a denial of the content request and a redirection of the content request.

16. The computer-implemented method of claim 14, further comprising:
   receiving rule specifications; and
   generating computer-executable business logic based on the rule specifications.

17. The computer-implemented method of claim 14, wherein the step of receiving the content request occurs at an edge server, the method further comprising:
   reading the first set of attribute values from the content request;
   formatting the first set of attribute values; and
   sending the first set of attribute values to a request authorization server associated with the edge server.

* * * * *